US011035746B2

(12) United States Patent
Lin et al.

(10) Patent No.: US 11,035,746 B2
(45) Date of Patent: Jun. 15, 2021

(54) MULTI-AXIS FORCE SENSOR CAPABLE OF REDUCING INFLUENCE ON THE OTHER WHEN MEASURING ONE OF THE AXIAL FORCE AND TORQUE

(71) Applicant: Industrial Technology Research Institute, Hsinchu (TW)

(72) Inventors: Chih-Che Lin, Tainan (TW); Chih-Yuan Chen, Taipei (TW); Chung-Yuan Su, Tainan (TW); Chao-Ta Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 179 days.

(21) Appl. No.: 16/517,685

(22) Filed: Jul. 22, 2019

(65) Prior Publication Data

US 2020/0200629 A1      Jun. 25, 2020

(30) Foreign Application Priority Data

Dec. 20, 2018   (TW) ................................. 107146034

(51) Int. Cl.
*G01L 5/16*   (2020.01)
*G01L 5/22*   (2006.01)
*G01L 5/162*   (2020.01)

(52) U.S. Cl.
CPC ............... *G01L 5/162* (2013.01); *G01L 5/22* (2013.01)

(58) Field of Classification Search
CPC . G01L 5/16; G01L 5/161; G01L 5/162; G01L 5/18; G01L 5/226; G01L 5/22;
(Continued)

(56) References Cited

U.S. PATENT DOCUMENTS 3,427,875 A * 2/1969 Saxl ...................... G01L 1/2231
73/862.045
3,481,192 A * 12/1969 Herzog ................. G01M 15/00
73/862.045
(Continued)

FOREIGN PATENT DOCUMENTS

CN          1234866      11/1999
CN          202720078    2/2013
(Continued)

OTHER PUBLICATIONS

"Office Action of Taiwan Counterpart Application," dated Sep. 23, 2019, p. 1-p. 6.
(Continued)

*Primary Examiner* — Tran M. Tran
(74) *Attorney, Agent, or Firm* — JCIPRNET

(57) ABSTRACT

A multi-axis force sensor including a central portion, an outer ring portion, and at least one sensing portion disposed along an axial direction of an axis is provided. The sensing portion includes a first and a second elements connected with each other, and at least one first and at least one second strain gauges. A first end surface of the first element is connected to the central portion, and a second end surface of the second element is connected to the outer ring portion. A normal vector of the first end surface is parallel to the axis and the axis passes through a centroid of the first end surface. When the first end surface is subjected to an axial force, a first strain of a first sensing region of the first element in the axial direction is smaller than a second strain of a second sensing region of the second element in the axial direction. When the first end surface is subjected to a first torque with respect to the axis, a first twist angle of the first sensing region with respect to the axis is greater than a
(Continued)

second twist angle of the second sensing region with respect to the axis.

27 Claims, 9 Drawing Sheets

(58) Field of Classification Search
CPC ........... G01L 1/22–2293; G01L 1/2206; G01L 1/048; G01L 1/2287; G01L 3/108; G01L 3/1457; G01L 5/0019; G01L 23/18; G01G 3/1402–1412
See application file for complete search history.

(56) References Cited

U.S. PATENT DOCUMENTS

| | | | | |
|---|---|---|---|---|
| 3,771,359 A * | 11/1973 | Shoberg | ............... | G01L 5/1627 73/862.044 |
| 3,867,838 A * | 2/1975 | Gerresheim | ........ | G01M 17/022 73/862.042 |
| 3,879,995 A * | 4/1975 | Libertiny | .............. | G01L 5/1627 73/862.044 |
| 4,094,192 A | 6/1978 | Watson et al. | | |
| 4,448,083 A * | 5/1984 | Hayashi | ................... | G01L 1/162 73/862.042 |
| 4,573,362 A * | 3/1986 | Amlani | ................ | G01L 1/2231 73/862.045 |
| 4,640,138 A * | 2/1987 | Meyer | ..................... | G01L 5/226 73/862.045 |
| 4,821,582 A * | 4/1989 | Meyer | ................... | G01L 5/1627 73/862.045 |
| 4,911,023 A * | 3/1990 | Izumi | .................... | G01L 1/2231 73/862.044 |
| 4,969,366 A * | 11/1990 | Okada | ...................... | G01L 1/18 73/777 |
| 5,222,400 A * | 6/1993 | Hilton | ..................... | G01L 5/223 73/862.043 |
| 5,315,882 A * | 5/1994 | Meyer | ................... | G01L 5/1627 73/862.44 |
| 5,490,427 A | 2/1996 | Yee et al. | | |
| 5,526,700 A | 6/1996 | Akeel | | |
| 5,894,094 A | 4/1999 | Kuchler et al. | | |
| 5,969,268 A * | 10/1999 | Sommerfeld | ......... | G01L 5/1627 73/862.041 |
| 6,038,933 A | 3/2000 | Meyer | | |
| 6,324,919 B1 * | 12/2001 | Larsen | ................... | G01L 5/1627 73/862.043 |
| 6,769,312 B2 | 8/2004 | Meyer et al. | | |
| 6,845,675 B2 * | 1/2005 | Meyer | ................... | G01L 5/1627 73/862.041 |
| 6,951,142 B2 | 10/2005 | Ohsato et al. | | |
| 7,047,826 B2 | 5/2006 | Peshkin | | |
| 7,490,524 B2 * | 2/2009 | Ohsato | ................... | G01L 5/162 73/862.629 |
| 7,743,672 B2 * | 6/2010 | Kurtz | ...................... | G01N 3/08 73/862.046 |
| 8,096,173 B2 * | 1/2012 | Isono | ..................... | G01L 5/169 73/146 |
| 8,250,934 B2 | 8/2012 | Sakurai | | |
| 8,291,775 B2 * | 10/2012 | Nagasaka | ............ | G01L 3/1457 73/862.338 |
| 8,671,780 B2 * | 3/2014 | Kwom | ................... | G01L 5/1627 73/862.045 |
| 8,726,741 B2 * | 5/2014 | Krippner | ............... | G01L 3/1457 73/862.045 |
| 8,776,616 B2 | 7/2014 | Szasz et al. | | |
| 8,844,376 B2 | 9/2014 | Siklos et al. | | |
| 8,904,884 B2 * | 12/2014 | Kim | ........................ | G01L 1/18 73/862.338 |
| 8,984,963 B2 * | 3/2015 | Christmann | .............. | G01L 3/10 73/862.041 |
| 9,080,921 B2 * | 7/2015 | Okada | ..................... | G01L 25/00 |
| 9,395,256 B2 | 7/2016 | Carignan | | |
| 9,435,705 B2 * | 9/2016 | Kim | ........................ | G01L 1/16 |
| 9,448,128 B2 * | 9/2016 | Kim | ..................... | G01L 5/1627 |
| 9,702,775 B2 * | 7/2017 | Stopps | ................... | G01L 3/1457 |
| 9,719,868 B2 * | 8/2017 | Sarakoglou | ............ | G01L 5/009 |
| 9,724,473 B2 * | 8/2017 | Demas | .................. | G01L 1/2206 |
| 9,757,080 B2 * | 9/2017 | Lee | ........................ | A61B 6/462 |
| 9,952,108 B2 | 4/2018 | Heo et al. | | |
| 10,058,298 B2 * | 8/2018 | Lee | ........................ | A61B 6/547 |
| 10,058,983 B2 * | 8/2018 | Liang | ..................... | B25B 21/00 |
| 10,078,026 B2 * | 9/2018 | Vinogradov-Nurenberg | ............... | G01L 5/1627 |
| 10,209,151 B2 * | 2/2019 | Okada | ........................ | G01L 3/14 |
| 10,239,213 B1 * | 3/2019 | Reich | ...................... | B25J 9/1638 |
| 10,422,707 B2 * | 9/2019 | Bradford | .................. | G01L 3/108 |
| 10,545,062 B2 * | 1/2020 | Meyer | ..................... | G01L 5/1627 |
| 10,739,216 B2 * | 8/2020 | Haehnle | ................. | G01L 3/1457 |
| 2005/0120809 A1 * | 6/2005 | Ramming | ............ | G01L 5/1627 73/862.044 |
| 2006/0037409 A1 * | 2/2006 | Ichige | ................... | G01L 1/2237 73/862 |
| 2006/0130595 A1 * | 6/2006 | Meyer | ................... | G01L 5/1627 73/862.041 |
| 2011/0107850 A1 | 5/2011 | Kim et al. | | |
| 2012/0234104 A1 | 9/2012 | Seibold | | |
| 2013/0139615 A1 | 6/2013 | Kwom et al. | | |
| 2016/0123822 A1 | 5/2016 | Janik et al. | | |
| 2016/0356662 A1 | 12/2016 | Meyer et al. | | |
| 2018/0073942 A1 | 3/2018 | Wu et al. | | |
| 2019/0250051 A1 * | 8/2019 | Suzuki | ................... | G01L 1/2237 |
| 2019/0275681 A1 * | 9/2019 | Bohme | ................... | G01L 3/108 |
| 2020/0309617 A1 * | 10/2020 | Mukai | ................... | G01L 1/2262 |

FOREIGN PATENT DOCUMENTS

| | | |
|---|---|---|
| CN | 103076131 | 5/2013 |
| CN | 103879949 | 6/2014 |
| CN | 104048791 | 9/2014 |
| CN | 106080945 | 11/2016 |
| CN | 107314852 | 11/2017 |
| CN | 107782482 | 3/2018 |
| EP | 0173405 | 4/1994 |
| EP | 0311695 | 11/1994 |
| EP | 1460399 | 9/2004 |
| JP | 2003254843 | 9/2003 |
| TW | 1403708 | 8/2013 |
| TW | 201534881 | 9/2015 |
| TW | 201823144 | 7/2018 |

OTHER PUBLICATIONS

Paul Szasz et al., "Planar 6-axis Force-Torque Sensor for Robots", ABB research center Germany, annual report 2012, Mar. 2013, pp. 32-37.
C. Jacq et al., "Thick-film multi-DOF force/torque sensor for wrist rehabilitation", Elsevier, Journal / series Sensors and Actuators. A, Physical, vol. 162, Issue 2, Aug. 2010, pp. 361-366.
Pham Huy Hoang et al., "Design and simulation of flexure-based planar force/torque sensor", 2010 IEEE Conference on Robotics, Automation and Mechatronics, Jun. 28-30, 2010, pp. 194-198.
"Office Action of China Counterpart Application", dated Apr. 2, 2021, p. 1-p. 8.

* cited by examiner

MULTI-AXIS FORCE SENSOR CAPABLE OF REDUCING INFLUENCE ON THE OTHER WHEN MEASURING ONE OF THE AXIAL FORCE AND TORQUE

CROSS REFERENCE TO RELATED APPLICATION

This application claims the priority benefit of Taiwan application serial no. 107146034, filed on Dec. 20, 2018. The entirety of the above-mentioned patent application is hereby incorporated by reference herein and made a part of specification.

BACKGROUND

Technical Field

The disclosure relates to a sensing device, and particularly relates to a multi-axis force sensor.

Description of Related Art

It is an inevitable trend to introduce robotic arms into the market at present, and its purpose is to achieve industry 4.0 and intelligent manufacturing. In order to improve functions of robotic arm strength/torque detection, feedback adjustment, etc., a multi-axis force sensor is an indispensable key to intelligence of the robotic arm. Now, most of multi-axis force sensors belong to a planar type, i.e. all of sensors are placed on the same plane, so that when an axial force and a torque are applied in an axial direction, it is easy to interact with other axial directions to cause a crosstalk phenomenon, such that sensing accuracy of the multi-axis force sensor is decreased. Therefore, how to reduce the influence of the axial force and the torque on measurement of other axial forces has become an urgent problem for multi-axis sensors.

SUMMARY

The disclosure provides a multi-axis force sensor including a central portion, an outer ring portion, and at least one sensing portion. The central portion includes a plurality of through holes, and the outer ring portion surrounds the central portion and is connected to the central portion through at least one support element. The sensing portion is disposed along an axial direction of an axis, and includes a first element, a second element, at least one first strain gauge, and at least one second strain gauge. The first element includes a first sensing region and a first end surface. The second element includes a second sensing region and a second end surface. The first element is connected to the second element, the first end surface is connected to the central portion, and the second end surface is connected to the outer ring portion. A normal vector of the first end surface is parallel to the axis and the axis passes through a centroid of the first end surface. The first strain gauge is disposed in the first sensing region, and the second strain gauge is disposed in the second sensing region. When the first end surface is subjected to a force along the axial direction, a first strain of the first sensing region in the axial direction is smaller than a second strain of the second sensing region in the axial direction. When the first end surface is subjected to a first torque with respect to the axis, a first twist angle of the first sensing region with respect to the axis is greater than a second twist angle of the second sensing region with respect to the axis.

The disclosure provides a multi-axis force sensor including a central portion, an outer ring portion, and at least one sensing portion. The central portion includes a plurality of through holes. The outer ring portion surrounds the central portion and is connected to the central portion through at least one support element. The sensing portion is disposed along an axial direction of an axis, and includes a first element, a second element, a third element, at least one first strain gauge, and at least one second strain gauge. The first element includes a first sensing region and a first end surface. The second element includes a second sensing region and a second end surface. The first end surface is connected to the central portion, and the second end surface is connected to the outer ring portion. A normal vector of the first end surface is parallel to the axis, and the axis passes through a centroid of the first end surface. The first element is connected to the second element through the third element. The first strain gauge is disposed in the first sensing region, and the second strain gauge is disposed in the second sensing region. When the first end surface is subjected to a force along the axial direction, a first strain of the first sensing region in the axial direction is smaller than a second strain of the second sensing region in the axial direction. When the first end surface is subjected to a first torque with respect to the axis, the third element makes a second torque applied on the second element smaller than the first torque, such that a first twist angle of the first sensing region with respect to the axis is greater than a second twist angle of the second sensing region with respect to the axis.

The disclosure provides a multi-axis force sensor including a central portion, an outer ring portion, and at least one sensing portion. The central portion includes a plurality of through holes. The outer ring portion surrounds the central portion and is connected to the central portion through at least one support element. The sensing portion is disposed along an axial direction of an axis, and includes a first element, a second element, a third element, at least one first strain gauge, and at least one second strain gauge. The first element includes a first sensing region and a first end surface. The second element includes a second sensing region and a second end surface. A first length of the first element is smaller than a second length of the second element. The first end surface is connected to the central portion, and the second end surface is connected to the outer ring portion. A normal vector of the first end surface is parallel to the axis, and the axis passes through a centroid of the first end surface. The first element is connected to the second element through the third element. The first strain gauge is disposed in the first sensing region, and the second strain gauge is disposed in the second sensing region. When the first end surface is subjected to a force along the axial direction, a first strain of the first sensing region in the axial direction is smaller than a second strain of the second sensing region in the axial direction. When the first end surface is subjected to a first torque with respect to the axis, the third element makes a second torque applied on the second element smaller than the first torque, such that a first twist angle of the first sensing region with respect to the axis is greater than a second twist angle of the second sensing region with respect to the axis. The first sensing region includes a first cross-section, and the second sensing region includes a second cross-section. Normal vectors of the first cross-section and the second cross-section are all parallel to the axial direction, and a first area of the first cross-section is greater than a second area of the second cross-section. A first area moment of inertia of the first cross-section is smaller than a second area moment of inertia of the second cross-section.

Based on the above description, in the design of the multi-axis force sensor of the embodiments of the disclosure, when the first end surface of the first element is subjected to the force along the axial direction, the first strain of the first sensing region of the first element in the axial direction is smaller than the second strain of the second sensing region of the second element in the axial direction. On the other hand, when the first end surface of the first element is subjected to the first torque with respect to the axial direction, the first twist angle of the first sensing region of the first element with respect to the axis is greater than the second twist angle of the second sensing region of the second element with respect to the axis. In brief, the multi-axis force sensor of the embodiments of the disclosure reduces an influence of the axial force on the torque measurement and reduces an influence of the torque on the axial force measurement through a rigid difference design of the first element and the second element of the sensing portion.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
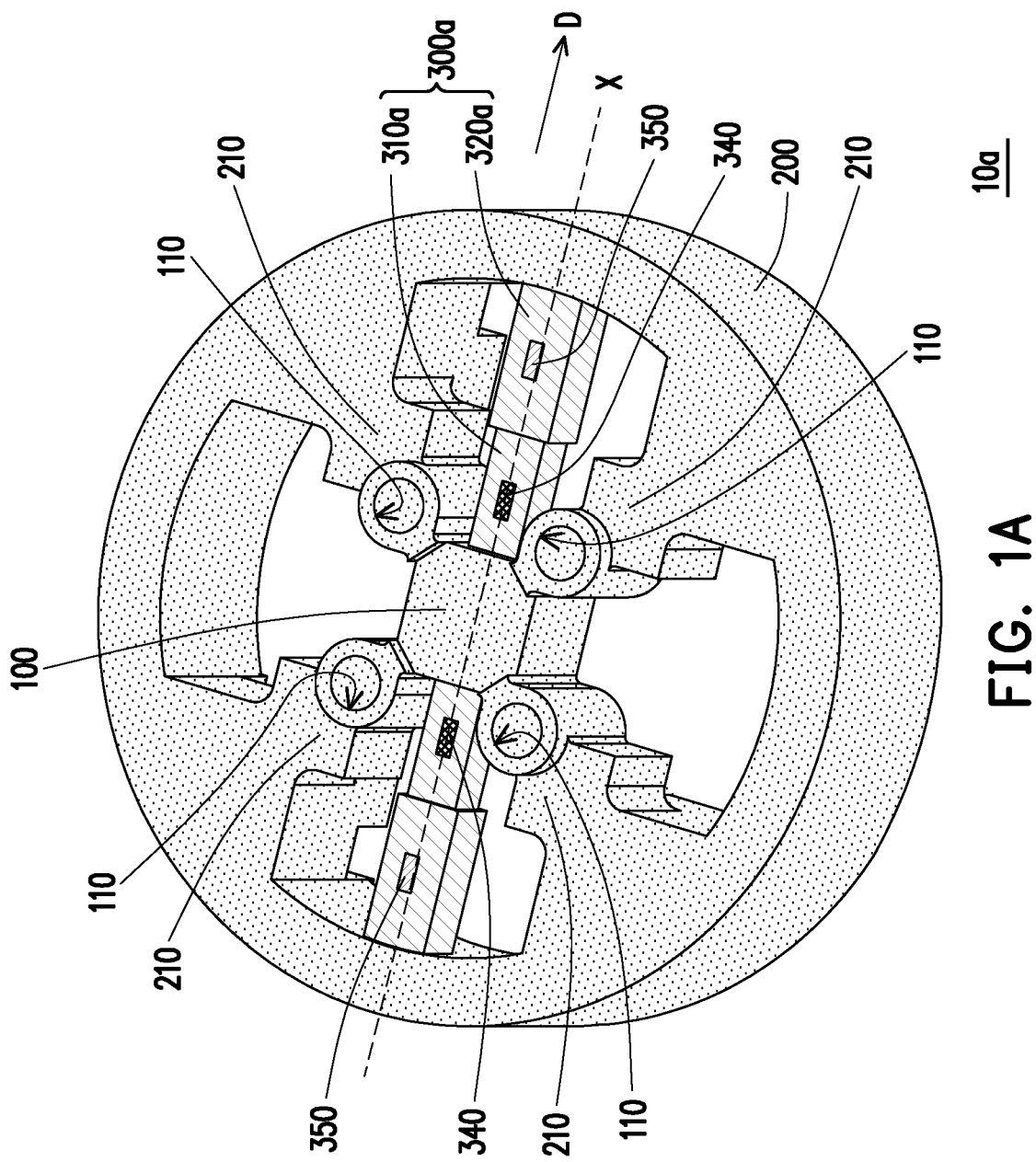
FIG. 1A is a three-dimensional view of a multi-axis force sensor according to an embodiment of the disclosure.
Figure 1B:
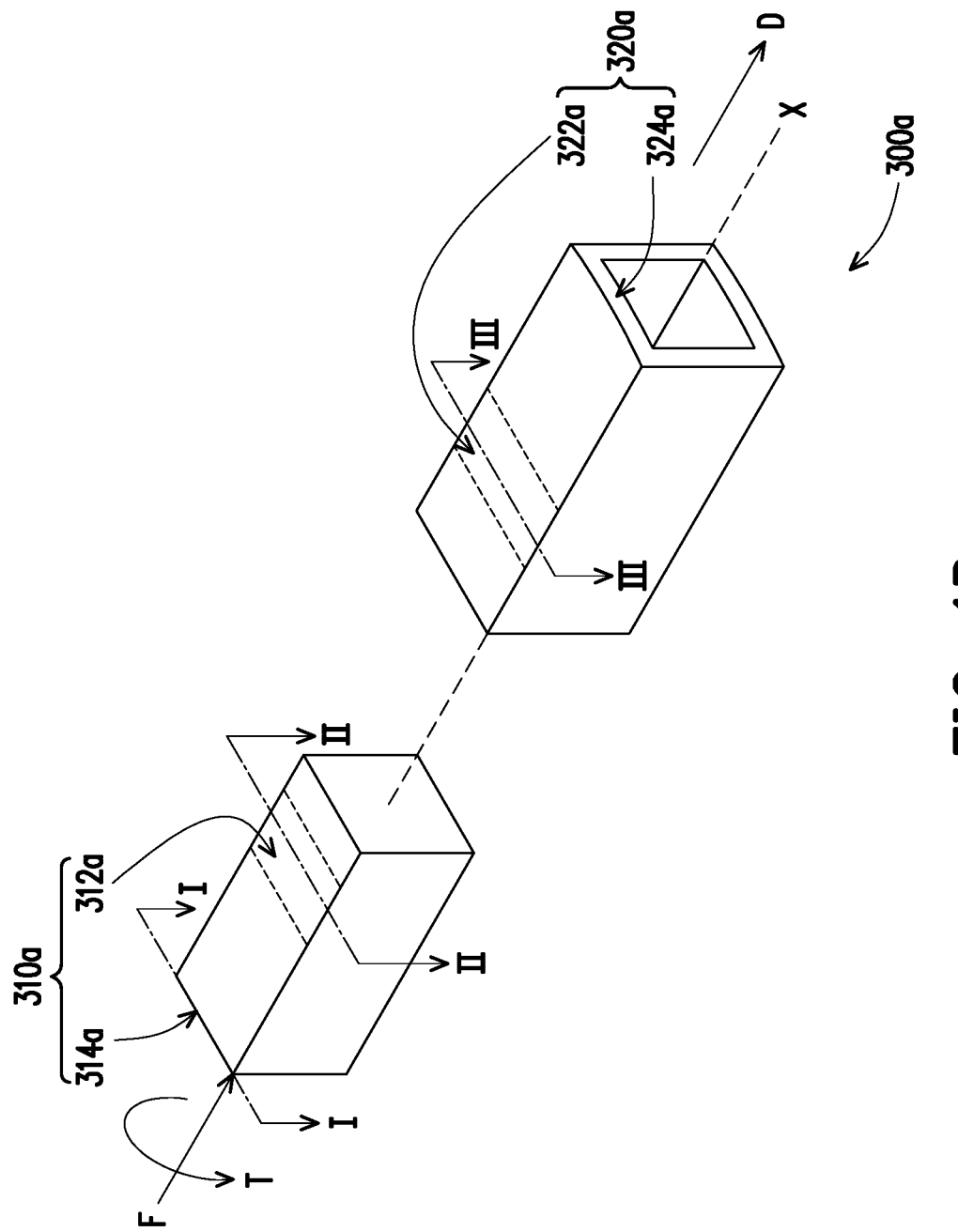
FIG. 1B is a three-dimensional exploded view of a sensing portion of the multi-axis force sensor of FIG. 1A.
Figure 1C:
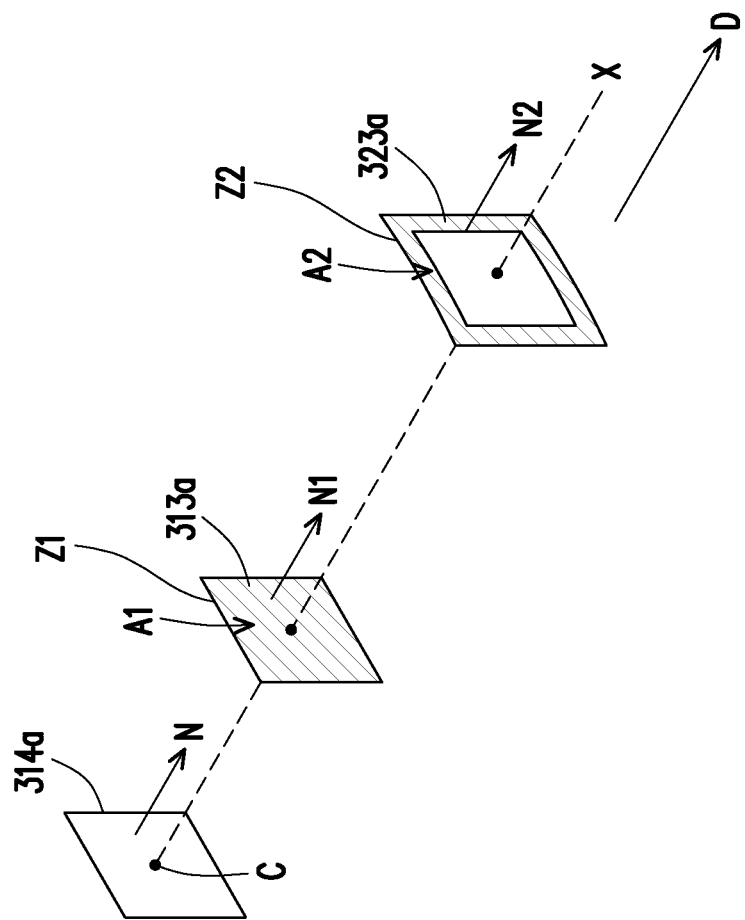
FIG. 1C is a schematic diagram of a first end surface of a first element, a first cross-section of a first sensing region, a second cross-section of a second sensing region and an axis of FIG. 1B.

FIG. 1A is a three-dimensional view of a multi-axis force sensor according to an embodiment of the disclosure. FIG. 1B is a three-dimensional exploded view of a sensing portion of the multi-axis force sensor of FIG. 1A. FIG. 1C is a schematic diagram of a first end surface of a first element, a first cross-section of a first sensing region, a second cross-section of a second sensing region and an axis of FIG. 1B. It should be noted that the first end surface, the first cross-section, and the second cross-section in FIG. 1C are respectively illustrated along section lines I-I, II-II and III-III of FIG. 1B.

Referring to FIG. 1A and FIG. 1B, the multi-axis force sensor 10a of the embodiment includes a central portion 100, an outer ring portion 200, and at least one sensing portion 300a (two sensing portions 300a are schematically illustrated in FIG. 1A). The central portion 100 includes a plurality of through holes 110 (four through holes 110 are schematically illustrated in FIG. 1A), and the through holes 110 fix the multi-axis force sensor 10a on an object to be tested, for example, a robotic arm. The outer ring portion 200 surrounds the central portion 100 and is connected to the central portion 100 through at least one support element 210 (four support elements 210 are schematically illustrated in FIG. 1A). Herein, the multi-axis force sensor 10a has a round appearance, though the disclosure is not limited thereto.

In detail, the sensing portions 300a of the embodiment are disposed along an axial direction D of an axis X, and each of the sensing portions 300a includes a first element 310a, a second element 320a, at least one first strain gauge 340 (one first strain gauge 340 is schematically illustrated in FIG. 1A) and at least one second strain gauge 350 (one second strain gauge 350 is schematically illustrated in FIG. 1A). The first element 310a is, for example, a twist element, and includes a first sensing region 312a and a first end surface 314a. The second element 320a is, for example, an elongation element, and includes a second sensing region 322a and a second end surface 324a. The first element 310a is, for example, a solid cuboid, and the second element 320a is, for example, a hollow cuboid, and the first element 310a is connected to the second element 320a. It should be noted that the "connection" mentioned in the specifications or claims of the disclosure includes "direct connection" or "indirect connection". In the embodiment, the first element 310a is directly connected to the second element 320a. The first end surface 314a of the first element 310a is connected to the central portion 100, and the second end surface 324a of the second element 320a is connected to the outer ring portion 200. The first strain gauge 340 is disposed in the first sensing region 312a, and is used for sensing a twist strain (i.e. a strain caused by a torque) of the first element 310a. The second strain gauge 350 is disposed in the second sensing region 322a, and is used for sensing an axial strain (i.e. a strain caused by an axial force) of the second element 320a. Preferably, a normal vector N of the first end surface 314a of the first element 310a is parallel to the axis X, and the axis X passes through a centroid C of the first end surface 314a.

Further, referring to FIG. 1B and FIG. 1C, in the embodiment, the first sensing region 312a of the first element 310a includes a first cross-section 313a, and the second sensing region 322a of the second element 320a includes a second cross-section 323a. A normal vector N1 of the first cross-section 313a and a normal vector N2 of the second cross-section 323a are all parallel to the axial direction D, and a first area A1 of the first cross-section 313a is greater than a second area A2 of the second cross-section 323a. Herein, the first area A1 is a rectangle, and the second area A2 is an annular rectangle. The first sensing region 312a is disposed on an upper surface (shown as FIG. 1B) or a lower surface (not shown) of the first element 310a, and the first sensing region 312a must include an edge Z1 of the first cross-section 313a. In order to increase sensitivity of the first strain gauge 340 (shown in FIG. 1A) for measuring a torque, an area moment of inertia of the first cross-section 313a is the smallest section area moment of inertia in the first element 310a. Similarly, the second sensing region 322a is disposed on an upper surface (shown as FIG. 1B) or a lower surface (not shown) of the second element 320a, and the second sensing region 322a must include an edge Z2 of the second cross-section 323a. In order to increase sensitivity of the second strain gauge 350 for measuring an axial force, an area of the second cross-section 323a is the smallest section area in the second element 320a.

When the first end surface 314a is subjected to a force F along the axial direction D, a first strain of the first sensing region 312a in the axial direction D is smaller than a second strain of the second sensing region 322a in the axial direction D. To be specific, since the first area A1 of the first cross-section 313a is greater than the second area A2 of the second cross-section 323a, when the first end surface 314a is subjected to the force F along the axial direction D, the axial strain of the first sensing region 312a is smaller than the axial strain of the second sensing region 322a.

On the other hand, a first area moment of inertia of the first cross-section 313a with respect to the axis X is smaller than a second area moment of inertia of the second cross-section 323a with respect to the axis X. Herein, the area moment of inertia is also referred to as a second moment of area. Regarding a small area dA on a plane, an area moment of inertia of the small area dA with respect to an axis may be defined as a product of the small area and a square of a perpendicular distance between the small area and the axis ($r^2$), i.e. $dI=r^2 dA$. Moreover, a first radius of gyration of the first cross-section 313a with respect to the axis X is smaller than a second radius of gyration of the second cross-section 323a with respect to the axis X. Herein, a radius of gyration (Rg) of a cross-section may be defined as a square root of a quotient which is calculated from dividing an area moment of inertia (I) of the cross-section with respect to an axis by an area (A) of the cross-section, i.e. $Rg=\sqrt{I/A}$. The axis required for calculating the area moment of inertia and the radius of gyration may be defined as the axis X passing through the centroid C of the cross-section.

When the first end surface 314a of the first element 310a is subjected to a first torque T with respect to the axis X, a first twist angle of the first sensing region 312a with respect to the axis X is greater than a second twist angle of the second sensing region 322a with respect to the axis X. Namely, when the first end surface 314a of the first element 310a is subjected to the first torque T with respect to the axis X, a twist strain of the second sensing region 322a is smaller than a twist strain of the first sensing region 312a. To be specific, since the first area moment of inertia of the first cross-section 313a with respect to the axis X is smaller than the second area moment of inertia of the second cross-section 323a with respect to the axis X, when the first end surface 314a of the sensing portion 300a is subjected to the first torque T with respect to the axis X, the twist strain of the second sensing region 322a is smaller than the twist strain of the first sensing region 312a. Moreover, since the first radius of gyration of the first cross-section 313a with respect to the axis X is smaller than the second radius of gyration of the second cross-section 323a with respect to the axis X, when the first end surface 314a of the sensing portion 300a is subjected to the first torque T with respect to the axis X, the twist strain of the second sensing region 322a is smaller than the twist strain of the first sensing region 312a.

In brief, the first element 310a and the second element 320a of the sensing portion 300a of the embodiment are used for withstanding forces and torques along the axial direction D, so that first element 310a and the second element 320a may be regarded as force-receiving elements. Herein, the first sensing region 312a of the first element 310a may be regarded as a torque sensing region, and the second sensing region 322a of the second element 320a may be regarded as a force sensing region. Based on a difference design of areas and area moments of inertia between the first element 310a and the second element 320a of the sensing portion 300a, the multi-axis force sensor 10a of the embodiment may reduce an influence of the axial force when the first sensing region 312a of the first element 310a measures a torque, and meanwhile reduce an influence of the torque when the second sensing region 322a of the second element 320a measures an axial force.

It should be noted that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

Figure 2A:
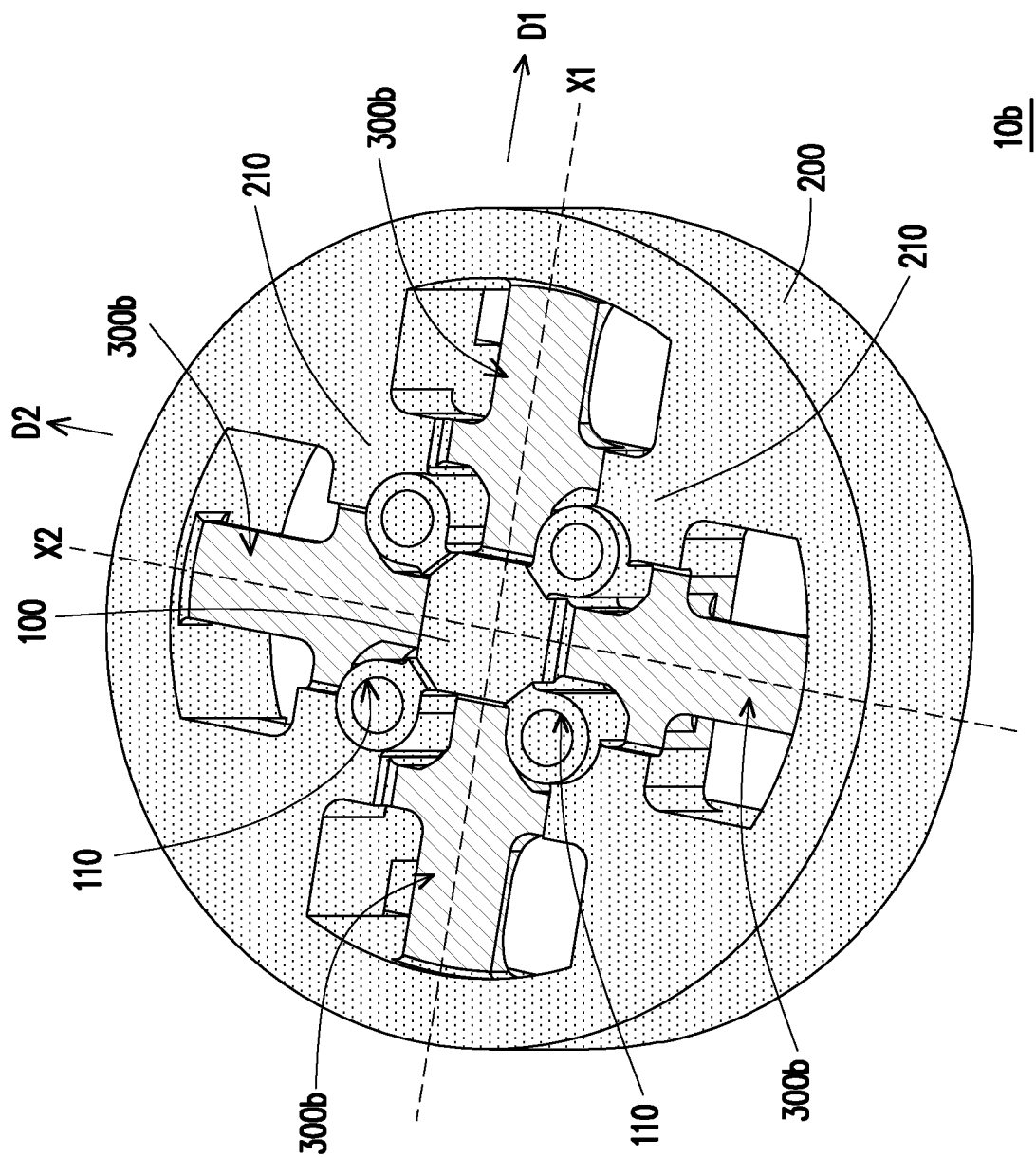
FIG. 2A is a three-dimensional view of a multi-axis force sensor according to another embodiment of the disclosure.
Figure 2B:
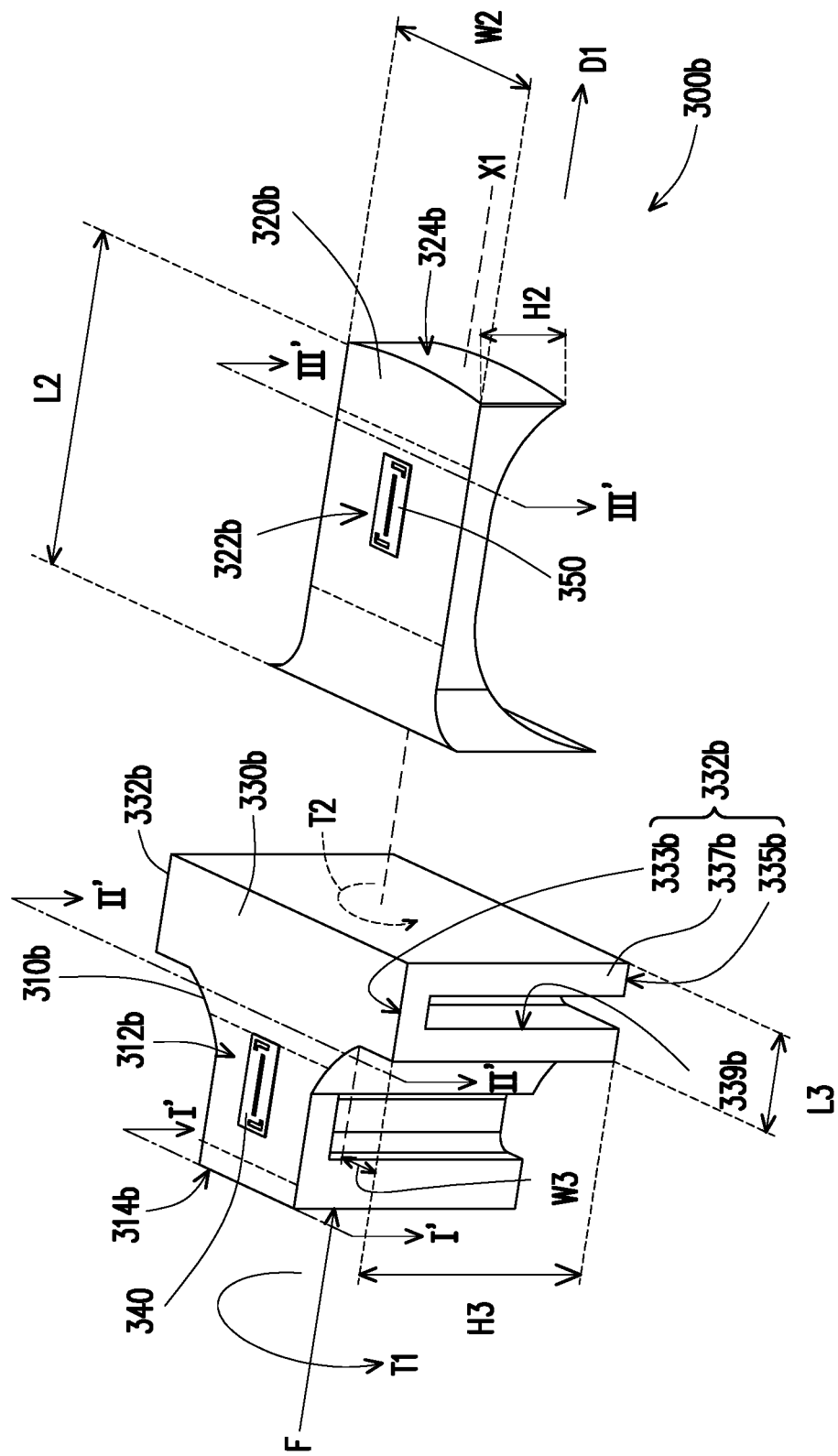
FIG. 2B is a three-dimensional exploded view of a sensing portion of the multi-axis force sensor of FIG. 2A.
Figure 2C:
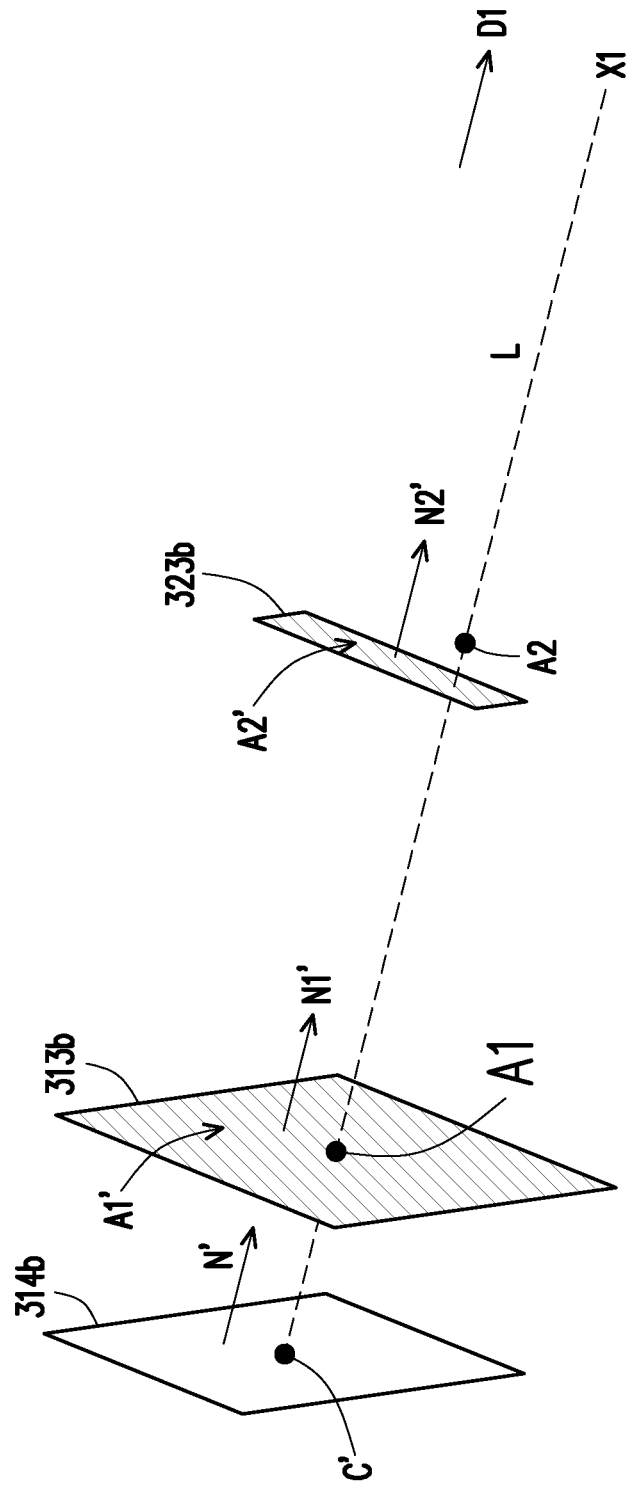
FIG. 2C is a schematic diagram of a first end surface of a first element, a first cross-section of a first sensing region, a second cross-section of a second sensing region and an axis of FIG. 2B.
Figure 2D:
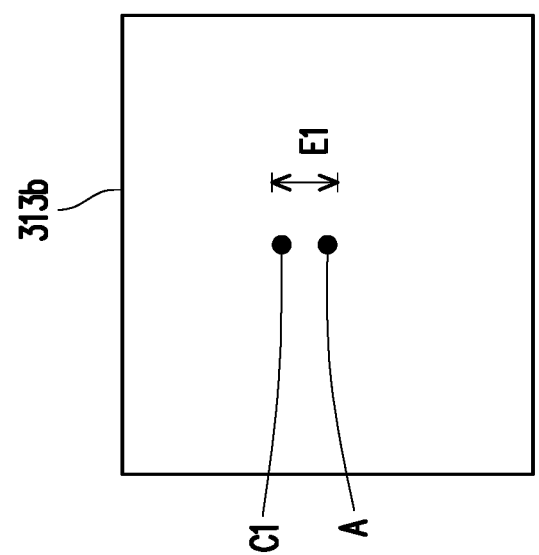
FIG. 2D is a schematic diagram of a first distance between a first centroid of the first cross-section of FIG. 2C and the axis.
Figure 2E:
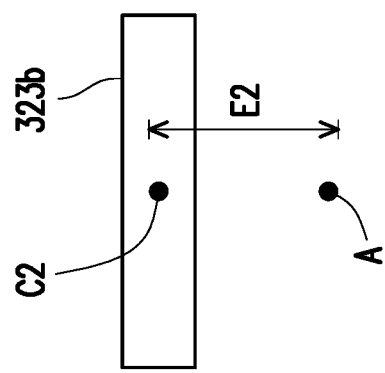
FIG. 2E is a schematic diagram of a second distance between a second centroid of the second cross-section of FIG. 2C and the axis.

FIG. 2A is a three-dimensional view of a multi-axis force sensor according to another embodiment of the disclosure. FIG. 2B is a three-dimensional exploded view of a sensing portion of the multi-axis force sensor of FIG. 2A. FIG. 2C is a schematic diagram of a first end surface of a first element, a first cross-section of a first sensing region, a second cross-section of a second sensing region and an axis of FIG. 2B. FIG. 2D is a schematic diagram of a first distance between a first centroid of the first cross-section of FIG. 2C and the axis. FIG. 2E is a schematic diagram of a second distance between a second centroid of the second cross-section of FIG. 2C and the axis. It should be noted that the first end surface, the first cross-section, and the second cross-section in FIG. 2C are respectively illustrated along section lines I'-I', II'-II' and III'-III' of FIG. 2B. Moreover, for simplicity's sake, a first strain gauge 340 and a second strain gauge 350 are illustrated in the sensing portion 300b of FIG. 2B, and are not illustrated in FIG. 2A.

Referring to FIG. 1A, FIG. 1B, FIG. 2A and FIG. 2B, the multi-axis force sensor 10b of the embodiment is similar to the multi-axis force sensor 10a of FIG. 1A, and a difference there between is that the number of the sensing portions 300b of the embodiment is four, where two of the sensing portions 300b are configured along an axial direction D1 of an axis X1, and the other two of the sensing portions 300b are configured along an axial direction D2 of an axis X2, where the axis X1 is perpendicular to the axis X2. Namely, the sensing portions 300b are arranged crosswise. The first end surface 314b of the first element 310b is connected to the central portion 100, and the second end surface 324b of the second element 320b is connected to the outer ring portion 200. Herein, structural designs of the first element 310b and the second element 320b are different to that of the aforementioned first element 310a and the second element 320a.

In detail, referring to FIG. 2B and FIG. 2C, a normal vector N' of the first end surface 314b of the first element 310b is parallel to the axis X1, and the axis X1 passes through a centroid C' of the first end surface 314b. The first sensing region 312b of the first element 310b includes a first cross-section 313b, and the second sensing region 322b of the second element 320b includes a second cross-section 323b. A normal vector N1' of the first cross-section 313b and a normal vector N2' of the second cross-section 323b are all parallel to the axial direction D1, and a first area A1' of the first cross-section 313b is greater than a second area A2' of the second cross-section 323b. Herein, the first area A1' and the second area A2' are all rectangles.

When the first end surface 314b is subjected to a force F along the axial direction D1, a first strain of the first sensing region 312b in the axial direction D1 is smaller than a second strain of the second sensing region 322b in the axial direction D1. Namely, when the first end surface 314b is subjected to the force F along the axial direction D1, the axial strain of the first sensing region 312b is smaller than the axial strain of the second sensing region 322b. To be specific, since the first area A1' of the first cross-section 313b is greater than the second area A2' of the second cross-section 323b, when the first end surface 314b is subjected to a force F along the axial direction D1, the axial strain of the first sensing region 312b is smaller than the axial strain of the second sensing region 322b. Therefore, when the first element 310b measures a torque, the influence of the axial force may be decreased to the minimum. Moreover, since a second area moment of inertia of the second cross-section 323b with respect to the axis X1 is greater than a first area moment of inertia of the first cross-section 313b with respect to the axis X1, when the first end surface 314b of the sensing portions 300b is subjected to the first torque T with respect to the axis X1, a twist strain of the second sensing region 322b is smaller than a twist strain of the first sensing region 312b.

Moreover, a length L2 of the second element 320b of the embodiment is greater than a height H2 of the second element 320b, and a width W2 of the second element 320b is greater than the height H2 of the second element 320b. Based on the above size relationship, the second area moment of inertia of the second cross-section 323b with respect to the axis X1 is greater than the first area moment of inertia of the first cross-section 313b with respect to the axis X1, and the second area A2' of the second cross-section 323b is smaller than the first area A1' of the first cross-section 313b. As shown in FIG. 2B, the first element 310b is not a solid cuboid, and the second element 320b is not a hollow cuboid and the height H2 thereof is not a constant value. Moreover, referring to FIG. 2C, FIG. 2D and FIG. 2E, a second distance E2 between a second centroid C2 of the second cross-section 323b and an axial center A of the axis X1 is greater than a first distance E1 between a first centroid C1 of the first cross-section 313b and the axial center A of the axis X1. Namely, the first distance E1 between the first centroid C1 of the first cross-section 313b and the axis X1 is smaller than the second distance E2 between the second centroid C2 of the second cross-section 323b and the axis X1. Based on the above different designs of the first element 310b and the second element 320b, the second area moment of inertia of the second cross-section 323b with respect to the axis X1 is greater than the first area moment of inertia of the first cross-section 313b with respect to the axis X1. In this way, when the second element 320b measures an axial force, the influence of the torque may be decreased to the minimum.

Moreover, referring to FIG. 2A and FIG. 2B, each of the sensing portions 300b of the embodiment further includes a third element 330b. The third element 330b of the sensing portion 300b disposed along the axial direction D1 of the axis X1 is respectively connected to the first element 310b and the second element 320b along the axial direction D1. The third element 330b of the sensing portion 300b disposed along the axial direction D2 of the axis X2 is respectively connected to the first element 310b and the second element 320b along the axial direction D2. In other words, the first element 310b is connected to the second element 320b along the axial direction D1, and the other first element 310b is connected to the second element 320b along the axial direction D2. In the embodiment, the first element 310b is indirectly connected to the second element 320b. The third element 330b is, for example, a connection element, and the third element 330b includes at least one protruding end 332b (two protruding ends 332b are schematically illustrated in FIG. 2B). Each of the protruding ends 332b includes an upper surface 333b, a lower surface 335b and a contact surface 337b. The contact surface 337b of the protruding end 332b is connected to the support element 210 to limit a displacement of the sensing portion 300b in the axial direction D1 and rotation of the same with respect to the axis X1. The contact surface 337b of the protruding end 332b includes a groove 339b used for adjusting a stiffness of the third element 330b along the axial direction D1 and a torsional stiffness of the e third element 330b with respect to the axis X1. Moreover, a height H3 of the contact surface 337b of the protruding end 332b is greater than a length L3 of the contact surface 337b, such that the third element 330b may withstand a larger torque, so as to decrease the torque applied on the second element 320b to improve the accuracy of the second element 320b for measuring the axial force.

When the first end surface 314b of the first element 310b is subjected to the first torque T1 with respect to the axis X1, the third element 330b makes a second torque T2 applied on the second element 320b smaller than the first torque T1. In other words, the third element 330b may reduce the torque transmitted to the second element 320b through the connections with the first element 310b, the second element 320b and the support element 210. When the torque transmitted to the second element 320b is reduced, the twist strain on the second element 320b is decreased. Moreover, in order to further decrease the twist strain of the second element 320b and increase sensitivity for measuring the axial force, the length L2 of the second element 320b may be greater than the height H2, and the width W2 of the second element 320b may be greater than the height H2.

Figure 3A:
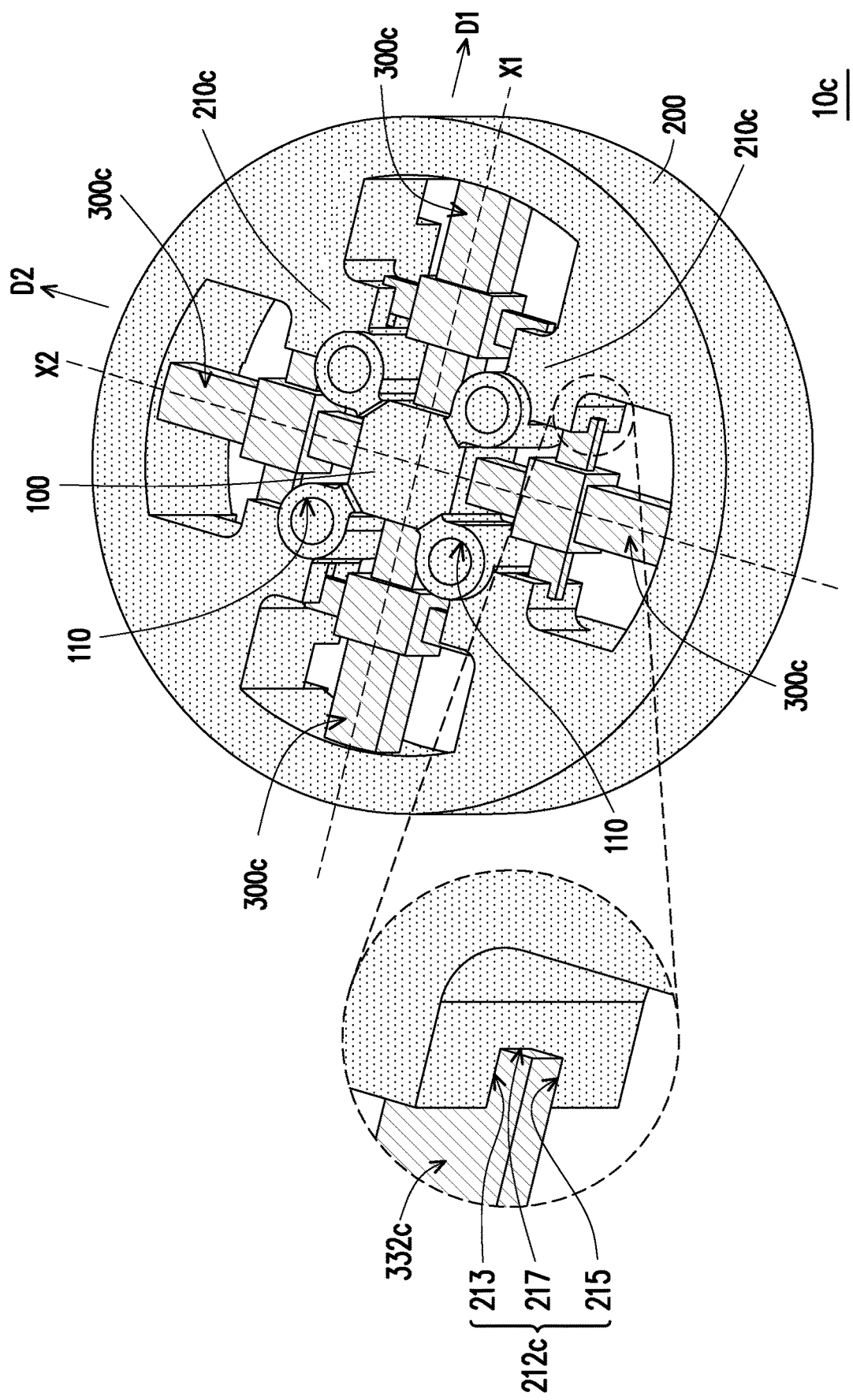
FIG. 3A is a three-dimensional view of a multi-axis force sensor according to still another embodiment of the disclosure.
Figure 3B:
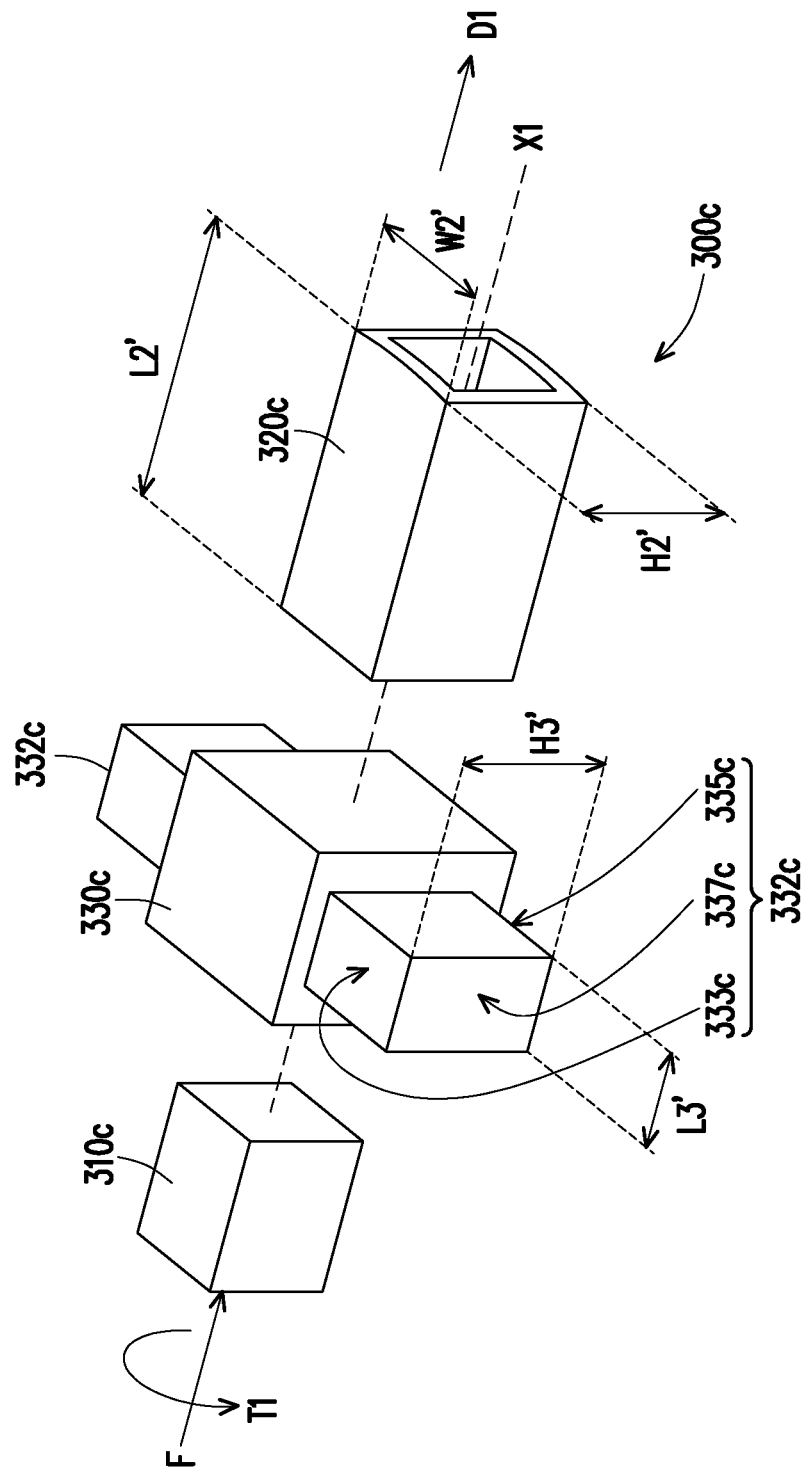
FIG. 3B is a three-dimensional exploded view of a sensing portion of the multi-axis force sensor of FIG. 3A.

FIG. 3A is a three-dimensional view of a multi-axis force sensor according to another embodiment of the disclosure. FIG. 3B is a three-dimensional exploded view of a sensing portion of the multi-axis force sensor of FIG. 3A. For simplicity's sake, the first strain gauge 340 and the second strain gauge 350 are omitted in FIG. 3A.

Referring to FIG. 2A, FIG. 2B, FIG. 3A and FIG. 3B, the multi-axis force sensor 10c of the embodiment is similar to the multi-axis force sensor 10b of FIG. 2A, and a difference there between is that the first element 310c of the embodiment is a solid cuboid, and the second element 320c is a hollow cuboid. The third element 330c includes two protruding ends 332c, and each of the protruding ends 332c includes an upper surface 333c, a lower surface 335c and a contact surface 337c. The support element 210c of the outer ring portion 200c includes a groove 212c, and the groove 212c includes an inner upper surface 213, an inner lower surface 215 and an inner contact surface 217. The upper surface 333c of the protruding end 332c contacts the inner upper surface 213 of the groove 212c or the lower surface 335c of the protruding end 332c contacts the inner lower surface 215 of the groove 212c. Namely, the protruding end 332c of the third element 330c and the groove 212c of the support element 210c have an assembly margin therebetween. Moreover, since the protruding end 332c only contacts the groove 212c, and is not connected to the support element 210c, movement of the third element 330c in the axial direction D1 is not limited, although the rotation of the third element 330c with respect to the axis X1 is limited.

Referring to FIG. 3A and FIG. 3B, the contact surface 337c of the protruding end 332c of the third element 330c contacts the support element 210c to limited the rotation of the third element 330c with respect to the axis X1, although the movement of the third element 330c in the axial direction D1 is not limited. Therefore, when a height H3' of the contact surface 337c of the protruding end 332c of the third element 330c is greater than a width L3' of the contact surface 337c, the third element 330c may withstand a larger torque, so as to reduce the torque transmitted to the second element 320c. Moreover, since a length L2' of the second element 320c is greater than a height H2' thereof, and a width W2' of the second element 320c is greater than the height H2', the second element 320c may have a larger axial deformation, but has a smaller twist deformation.

In brief, based on a difference design of areas and area moments of inertia between the first element 310c and the second element 320c of the sensing portion 300c, the multi-axis force sensor 10c of the embodiment may reduce the influence of the axial force on torque measurement and reduce the influence of the torque on axial force measurement. When the force F along the axial direction D1 is input, since the area of the cross-section of the second element 320c is smaller, the second element 320c may have a larger axial strain, so that the sensitivity of measuring the axial force is increased. On the other hand, when the first torque T1 is input with respect to the axis X1, since the area moment of inertia of the first element 310c is smaller, the first element 310c may have a larger twist strain, so that the sensitivity of measuring the torque is increased. Moreover, the sensing portion 300c may further include the third element 330c, and when the first element 310c is subjected to the first torque T1 with respect to the axis X1, the third element 330c makes the torque applied on the second element 320b smaller than the first torque T1. Therefore, the twist strain generated by the second element 320b is decreased, so as to reduce the influence of the first torque T1 on axial strain measurement.

It should be noted that the number and arrangement of the sensing portions 300a, 300b and 300c of the multi-axis force sensors 10a, 10b and 10c are not limited by the embodiments of the disclosure, and the number and the arrangement may be changed according to an actual requirement. Moreover, the structural patterns of the sensing portions 300a, 300b and 300c are not limited by the embodiments of the disclosure, and the structural pattern is considered to be within a protection scope of the disclosure as long as following conditions are satisfied: when the first element 310a, 310b or 310c is subjected to the force F in the axial direction D, D1 or D2, the first strain of the first element 310a, 310b or 310c in the axial direction D, D1 or D2 is smaller than the second strain of the second element 320a, 320b or 320c in the axial direction D, D1 or D2, and when the first element 310a, 310b or 310c is subjected to the first torque T, T1 along the axial direction D, D1 or D2, the first twist angle of the first element 310a, 310b or 310c with respect to the axial direction D, D1 or D2 is greater than the second twist angle of the second element 320a, 320b or 320c with respect to the axial direction D, D1 or D2.

In summary, the multi-axis force sensor of the embodiments of the disclosure reduces an influence of the axial force on the torque measurement and reduces an influence of the torque on the axial force measurement based on the difference design of areas and area moments of inertia between the first element and the second element of the sensing portion.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A multi-axis force sensor, comprising:
   a central portion, comprising a plurality of through holes;
   an outer ring portion, surrounding the central portion and connected to the central portion through at least one support element; and
   at least one sensing portion, disposed along an axial direction of an axis, and comprising:
   a first element, comprising a first sensing region and a first end surface;
   a second element, comprising a second sensing region and a second end surface, wherein the first element is connected to the second element, the first end surface is connected to the central portion, and the second end surface is connected to the outer ring portion, a normal vector of the first end surface is parallel to the axis, and the axis passes through a centroid of the first end surface;
   at least one first strain gauge, disposed in the first sensing region; and
   at least one second strain gauge, disposed in the second sensing region,
   wherein when the first end surface is subjected to a force along the axial direction, a first strain of the first sensing region in the axial direction is smaller than a second strain of the second sensing region in the axial direction, and when the first end surface is subjected to a first torque with respect to the axis, a first twist angle of the first sensing region with respect to the axis is greater than a second twist angle of the second sensing region with respect to the axis.

2. The multi-axis force sensor as claimed in claim 1, wherein the first sensing region comprises a first cross-section, the second sensing region comprises a second cross-section, a normal vector of the first cross-section and a normal vector of the second cross-section are all parallel to the axial direction, and a first area of the first cross-section is greater than a second area of the second cross-section.

3. The multi-axis force sensor as claimed in claim 2, wherein a first area moment of inertia of the first cross-section with respect to the axis is smaller than a second area moment of inertia of the second cross-section with respect to the axis.

4. The multi-axis force sensor as claimed in claim 3, wherein a first radius of gyration of the first cross-section with respect to the axis is smaller than a second radius of gyration of the second cross-section with respect to the axis.

5. The multi-axis force sensor as claimed in claim 3, wherein a first distance between a first centroid of the first element and the axis is smaller than a second distance between a second centroid of the second element and the axis.

6. The multi-axis force sensor as claimed in claim 3, wherein the at least one sensing portion further comprises a third element, the third element is respectively connected to the first element and the second element along the axial direction, and when the first end surface of the first element is subjected to the first torque with respect to the axis, the third element makes a second torque applied on the second element smaller than the first torque.

7. The multi-axis force sensor as claimed in claim 6, wherein the third element comprises at least one protruding end, and the at least one protruding end comprises an upper surface, a lower surface and a contact surface.

8. The multi-axis force sensor as claimed in claim 7, wherein the contact surface of the at least one protruding end is connected to the at least one support element.

9. The multi-axis force sensor as claimed in claim 7, wherein the at least one support element comprises a groove, and the groove comprises an inner upper surface, an inner lower surface and an inner contact surface, and the upper surface of the at least one protruding end contacts the inner upper surface of the groove or the lower surface of the at least one protruding end contacts the inner lower surface of the groove.

10. The multi-axis force sensor as claimed in claim 7, wherein a height of the contact surface of the at least one protruding end is greater than a length of the contact surface.

11. The multi-axis force sensor as claimed in claim 7, wherein the contact surface of the at least one protruding end comprises a groove used for adjusting a stiffness of the third element along the axial direction and a torsional stiffness of the third element with respect to the axis.

12. The multi-axis force sensor as claimed in claim 6, wherein a length of the second element is greater than a height of the second element, and a width of the second element is greater than the height of the second element.

13. A multi-axis force sensor, comprising:
a central portion, comprising a plurality of through holes;
an outer ring portion, surrounding the central portion and connected to the central portion through at least one support element; and
at least one sensing portion, disposed along an axial direction of an axis, and comprising:
a first element, comprising a first sensing region and a first end surface;
a second element, comprising a second sensing region and a second end surface, wherein the first end surface is connected to the central portion, the second end surface is connected to the outer ring portion, a normal vector of the first end surface is parallel to the axis, and the axis passes through a centroid of the first end surface;
a third element, wherein the first element is connected to the second element through the third element; at least one first strain gauge, disposed in the first sensing region; and at least one second strain gauge, disposed in the second sensing region,
wherein when the first end surface is subjected to a force along the axial direction, a first strain of the first sensing region in the axial direction is smaller than a second strain of the second sensing region in the axial direction, and when the first end surface is subjected to a first torque with respect to the axis, the third element makes a second torque applied on the second element smaller than the first torque, such that a first twist angle of the first sensing region with respect to the axis is greater than a second twist angle of the second sensing region with respect to the axis.

14. The multi-axis force sensor as claimed in claim 13, wherein the first sensing region comprises a first cross-section, the second sensing region comprises a second cross-section, a normal vector of the first cross-section and a normal vector of the second cross-section are all parallel to the axial direction, and a first area of the first cross-section is greater than a second area of the second cross-section.

15. The multi-axis force sensor as claimed in claim 14, wherein the third element comprises at least one protruding end, and the at least one protruding end comprises an upper surface, a lower surface and a contact surface.

16. The multi-axis force sensor as claimed in claim 15, wherein the contact surface of the at least one protruding end is connected to the at least one support element.

17. The multi-axis force sensor as claimed in claim 15, wherein the at least one support element comprises a groove, and the groove comprises an inner upper surface, an inner lower surface and an inner contact surface, and the upper surface of the at least one protruding end contacts the inner upper surface or the lower surface of the at least one protruding end contacts the inner lower surface.

18. The multi-axis force sensor as claimed in claim 15, wherein a height of the contact surface is greater than a length of the contact surface.

19. The multi-axis force sensor as claimed in claim 15, wherein the contact surface comprises a groove used for adjusting a stiffness of the third element along the axial direction and a torsional stiffness of the third element with respect to the axis.

20. The multi-axis force sensor as claimed in claim 14, wherein a length of the second element is greater than a height of the second element, and a width of the second element is greater than the height of the second element.

21. A multi-axis force sensor, comprising:
a central portion, comprising a plurality of through holes;
an outer ring portion, surrounding the central portion and connected to the central portion through at least one support element; and
at least one sensing portion, disposed along an axial direction of an axis, and comprising:
a first element, comprising a first sensing region and a first end surface;
a second element, comprising a second sensing region and a second end surface, wherein a first length of the first element is smaller than a second length of the second element, the first end surface is connected to the central portion, the second end surface is connected to the outer ring portion, and a normal vector of the first end surface is parallel to the axis, and the axis passes through a centroid of the first end surface;
a third element, wherein the first element is connected to the second element through the third element;
at least one first strain gauge, disposed in the first sensing region; and
at least one second strain gauge, disposed in the second sensing region,
wherein when the first end surface is subjected to a force along the axial direction, a first strain of the first sensing region in the axial direction is smaller than a second strain of the second sensing region in the axial direction, and when the first end surface is subjected to a first torque with respect to the axis, the third element makes a second torque applied on by the second element smaller than the first torque, such that a first twist angle of the first sensing region with respect to the axis is greater than a second twist angle of the second sensing region with respect to the axis;
wherein the first sensing region comprises a first cross-section, and the second sensing region comprises a second cross-section, normal vectors of the first cross-section and the second cross-section are all parallel to the axial direction, a first area of the first cross-section is greater than a second area of the second cross-section, and a first area moment of inertia of the first cross-section is smaller than a second area moment of inertia of the second cross-section.

22. The multi-axis force sensor as claimed in claim 21, wherein a first distance between a first centroid of the first element and the axis is smaller than a second distance between a second centroid of the second element and the axis.

23. The multi-axis force sensor as claimed in claim 21, wherein the third element comprises at least one protruding end, and the at least one protruding end comprises an upper surface, a lower surface and a contact surface.

24. The multi-axis force sensor as claimed in claim 23, wherein the contact surface of the at least one protruding end is connected to the at least one support element.

25. The multi-axis force sensor as claimed in claim 24, wherein a height of the contact surface is greater than a length of the contact surface.

26. The multi-axis force sensor as claimed in claim 25, wherein the contact surface comprises a groove used for adjusting a stiffness of the third element along the axial direction and a torsional stiffness of the third element with respect to the axis.

27. The multi-axis force sensor as claimed in claim 25, wherein a length of the second element is greater than a height of the second element, and a width of the second element is greater than the height of the second element.

* * * * *